(12) United States Patent
Christie et al.

(10) Patent No.: US 9,492,784 B2
(45) Date of Patent: *Nov. 15, 2016

(54) COMPOSITE OXYGEN TRANSPORT MEMBRANE

(71) Applicants: Gervase Maxwell Christie, Amherst, NY (US); Jonathan A. Lane, Amherst, NY (US)

(72) Inventors: Gervase Maxwell Christie, Amherst, NY (US); Jonathan A. Lane, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/322,981

(22) Filed: Jul. 3, 2014

(65) Prior Publication Data

US 2014/0311346 A1 Oct. 23, 2014

Related U.S. Application Data

(63) Continuation of application No. 13/644,666, filed on Oct. 4, 2012, now Pat. No. 8,795,417.

(60) Provisional application No. 61/576,108, filed on Dec. 15, 2011.

(51) Int. Cl.
*B01D 53/22* (2006.01)
*B01D 67/00* (2006.01)
(Continued)

(52) U.S. Cl.
CPC ......... *B01D 53/228* (2013.01); *B01D 67/0041* (2013.01); *B01D 69/02* (2013.01);
(Continued)

(58) Field of Classification Search
CPC B01D 53/22; B01D 53/228; B01D 67/0041; B01D 69/02; B01D 69/12; B01D 71/024; B01D 71/028; B01D 2255/402; B01D 2255/407; B01D 2255/902; B01D 2256/12; B01D 2257/104; B01D 2258/06; B01D 2325/023; C01B 13/0255; C04B 35/01; C04B 35/016; C04B 35/2633; C04B 35/42; C04B 35/44; C04B 35/462; C04B 35/488; C04B 38/00; C04B 2111/00612; C04B 2111/00801; C04B 2111/0081; C04B 2235/3208; C04B 2235/3217; C04B 2235/3222; C04B 2235/3224; C04B 2235/3225; C04B 2235/3227; C04B 2235/3229; C04B 2235/3232; C04B 2235/3234; C04B 2235/3243; C04B 2235/324; Y10T 428/1314; Y10T 428/24997; Y10T 428/24999

See application file for complete search history.

(56) References Cited

U.S. PATENT DOCUMENTS 2,593,507 A 4/1952 Wainer
2,692,760 A 10/1954 Flurschutz
(Continued)

FOREIGN PATENT DOCUMENTS

EP 0926096 A1 6/1999
EP 0984500 A2 3/2000
(Continued)

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.
(Continued)

*Primary Examiner* — Anthony Shumate
(74) *Attorney, Agent, or Firm* — Ralph J. Mancini

(57) ABSTRACT

A method of producing a composite oxygen ion membrane and a composite oxygen ion membrane in which a porous fuel oxidation layer and a dense separation layer and optionally, a porous surface exchange layer are formed on a porous support from mixtures of $(Ln_{1-x}A_x)_wCr_{1-y}B_yO_{3-\delta}$ and a doped zirconia. In the porous fuel oxidation layer and the optional porous surface exchange layer, A is Calcium and in the dense separation layer A is not Calcium and, preferably is Strontium. Preferred materials are $(La_{0.8}Ca_{0.2})_{0.95}Cr_{0.5}Mn_{0.5}O_{3-\delta}$ for the porous fuel oxidation and optional porous surface exchange layers and $(La_{0.8}Sr_{0.2})_{0.95}Cr_{0.5}Fe_{0.5}O_{3-\delta}$ for the dense separation layer. The use of such materials allows the membrane to sintered in air and without the use of pore formers to reduce membrane manufacturing costs. The use of materials, as described herein, for forming the porous layers have application for forming any type of porous structure, such as a catalyst support.

32 Claims, 1 Drawing Sheet

(51) Int. Cl.
*B01D 69/02* (2006.01)
*B01D 69/12* (2006.01)
*B01D 71/02* (2006.01)
*C01B 13/02* (2006.01)
*C04B 38/00* (2006.01)
*C04B 35/01* (2006.01)
*C04B 35/26* (2006.01)
*C04B 35/42* (2006.01)
*C04B 35/44* (2006.01)
*C04B 35/462* (2006.01)
*C04B 35/488* (2006.01)
*C04B 111/00* (2006.01)

(52) U.S. Cl.
CPC ......... *B01D 69/12* (2013.01); *B01D 71/024* (2013.01); *B01D 71/028* (2013.01); *C01B 13/0255* (2013.01); *C04B 35/01* (2013.01); *C04B 35/016* (2013.01); *C04B 35/2633* (2013.01); *C04B 35/42* (2013.01); *C04B 35/44* (2013.01); *C04B 35/462* (2013.01); *C04B 35/488* (2013.01); *C04B 38/00* (2013.01); *B01D 2255/402* (2013.01); *B01D 2255/407* (2013.01); *B01D 2255/902* (2013.01); *B01D 2256/12* (2013.01); *B01D 2257/104* (2013.01); *B01D 2258/06* (2013.01); *B01D 2325/023* (2013.01); *C04B 2111/0081* (2013.01); *C04B 2111/00612* (2013.01); *C04B 2111/00801* (2013.01); *C04B 2235/3208* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3234* (2013.01); *C04B 2235/3243* (2013.01); *C04B 2235/3246* (2013.01); *C04B 2235/3262* (2013.01); *C04B 2235/3268* (2013.01); *C04B 2235/3272* (2013.01); *C04B 2235/3274* (2013.01); *C04B 2235/3275* (2013.01); *C04B 2235/5445* (2013.01); *C04B 2235/768* (2013.01); *C04B 2235/80* (2013.01); *Y10T 428/1314* (2015.01); *Y10T 428/24997* (2015.04); *Y10T 428/24999* (2015.04)

(56) References Cited

U.S. PATENT DOCUMENTS

| | | | |
|---|---|---|---|
| 3,282,803 A | 11/1966 | Poepel et al. | |
| 3,317,298 A | 5/1967 | Klomp et al. | |
| 3,770,621 A | 11/1973 | Collins et al. | |
| 3,861,723 A | 1/1975 | Kunz et al. | |
| 3,930,814 A | 1/1976 | Gessner | |
| 3,976,451 A | 8/1976 | Blackmer et al. | |
| 4,013,592 A | 3/1977 | Matsuoka et al. | |
| 4,128,776 A | 12/1978 | Boquist et al. | |
| 4,153,426 A | 5/1979 | Wintrell | |
| 4,162,993 A | 7/1979 | Retalick | |
| 4,175,153 A | 11/1979 | Dobo et al. | |
| 4,183,539 A | 1/1980 | French et al. | |
| 4,206,803 A | 6/1980 | Finnemore et al. | |
| 4,261,167 A | 4/1981 | Paull et al. | |
| 4,292,209 A | 9/1981 | Marchant et al. | |
| 4,350,617 A | 9/1982 | Retalick et al. | |
| 4,357,025 A | 11/1982 | Eckart | |
| 4,365,021 A | 12/1982 | Pirooz | |
| 4,373,575 A | 2/1983 | Hayes | |
| 4,402,871 A | 9/1983 | Retalick | |
| 4,609,383 A | 9/1986 | Bonaventura et al. | |
| 4,631,238 A | 12/1986 | Ruka | |
| 4,650,814 A | 3/1987 | Keller | |
| 4,651,809 A | 3/1987 | Gollnick et al. | |
| 4,720,969 A | 1/1988 | Jackman | |
| 4,734,273 A | 3/1988 | Haskell | |
| 4,749,632 A | 6/1988 | Flandermeyer et al. | |
| 4,783,085 A | 11/1988 | Wicks et al. | |
| 4,791,079 A | 12/1988 | Hazbun | |
| 4,862,949 A | 9/1989 | Bell, III | |
| 4,866,013 A | 9/1989 | Anseau et al. | |
| 5,021,137 A | 6/1991 | Joshi et al. | |
| 5,035,726 A | 7/1991 | Chen et al. | |
| 5,061,297 A | 10/1991 | Krasberg | |
| 5,143,751 A | 9/1992 | Richard et al. | |
| 5,169,506 A | 12/1992 | Michaels | |
| 5,169,811 A | 12/1992 | Cipollini et al. | |
| 5,171,646 A | 12/1992 | Rohr | |
| 5,185,301 A | 2/1993 | Li et al. | |
| 5,205,990 A | 4/1993 | Lawless | |
| 5,240,480 A | 8/1993 | Thorogood et al. | |
| 5,259,444 A | 11/1993 | Wilson | |
| 5,286,686 A | 2/1994 | Haig et al. | |
| 5,298,469 A | 3/1994 | Haig et al. | |
| 5,302,258 A | 4/1994 | Renlund et al. | |
| 5,306,411 A | 4/1994 | Mazanec et al. | |
| 5,342,705 A | 8/1994 | Minh et al. | |
| 5,356,730 A | 10/1994 | Minh et al. | |
| 5,417,101 A | 5/1995 | Weich | |
| 5,432,705 A | 7/1995 | Severt et al. | |
| 5,454,923 A | 10/1995 | Nachlas et al. | |
| 5,478,444 A | 12/1995 | Liu et al. | |
| 5,534,471 A | 7/1996 | Carolan et al. | |
| 5,547,494 A | 8/1996 | Prasad et al. | |
| 5,569,633 A | 10/1996 | Carolan et al. | |
| 5,599,509 A | 2/1997 | Toyao et al. | |
| 5,643,355 A | 7/1997 | Phillips et al. | |
| 5,649,517 A | 7/1997 | Poola et al. | |
| 5,702,959 A * | 12/1997 | Hutter | H01L 21/761 148/DIG. 109 |
| 5,707,911 A | 1/1998 | Rakhimov et al. | |
| 5,712,220 A * | 1/1998 | Carolan | B01D 53/228 502/324 |
| 5,733,435 A * | 3/1998 | Prasad | B01D 53/22 204/421 |
| 5,750,279 A | 5/1998 | Carolan et al. | |
| 5,804,155 A | 9/1998 | Farrauto et al. | |
| 5,820,654 A | 10/1998 | Gottzman et al. | |
| 5,820,655 A | 10/1998 | Gottzmann et al. | |
| 5,837,125 A | 11/1998 | Prasad et al. | |
| 5,855,762 A | 1/1999 | Phillips et al. | |
| 5,864,576 A | 1/1999 | Nakatani et al. | |
| 5,902,379 A | 5/1999 | Phillips et al. | |
| 5,927,103 A | 7/1999 | Howard | |
| 5,932,141 A | 8/1999 | Rostrop-Nielsen et al. | |
| 5,944,874 A | 8/1999 | Prasad et al. | |
| 5,964,922 A | 10/1999 | Keskar et al. | |
| 5,975,130 A | 11/1999 | Ligh et al. | |
| 5,980,840 A | 11/1999 | Kleefisch et al. | |
| 6,010,614 A | 1/2000 | Keskar et al. | |
| 6,035,662 A | 3/2000 | Howard et al. | |
| 6,048,472 A | 4/2000 | Nataraj et al. | |
| 6,051,125 A | 4/2000 | Pham et al. | |
| 6,070,471 A | 6/2000 | Westphal et al. | |
| 6,077,323 A | 6/2000 | Nataraj et al. | |
| 6,110,979 A | 8/2000 | Nataraj et al. | |
| 6,113,673 A | 9/2000 | Loutfy et al. | |
| 6,114,400 A | 9/2000 | Nataraj et al. | |
| 6,139,810 A | 10/2000 | Gottzmann et al. | |
| 6,153,163 A | 11/2000 | Prasad et al. | |
| 6,191,573 B1 | 2/2001 | Noda | |
| RE37,134 E | 4/2001 | Wilson | |
| 6,214,066 B1 | 4/2001 | Nataraj et al. | |
| 6,214,314 B1 | 4/2001 | Abbott | |
| 6,290,757 B1 | 9/2001 | Lawless | |
| 6,293,084 B1 | 9/2001 | Drnevich et al. | |
| 6,296,686 B1 | 10/2001 | Prasad et al. | |
| 6,352,624 B1 | 3/2002 | Crome et al. | |
| 6,360,524 B1 | 3/2002 | Drnevich et al. | |
| 6,368,491 B1 | 4/2002 | Cao et al. | |
| 6,382,958 B1 | 5/2002 | Bool, III et al. | |
| 6,394,043 B1 | 5/2002 | Bool, III et al. | |

(56) References Cited

U.S. PATENT DOCUMENTS

| | | |
|---|---|---|
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,238,201 B2 * | 1/2016 | Kelly ............... C01B 3/384 |
| 2002/0073938 A1 | 6/2002 | Bool et al. |
| 2002/0078906 A1 | 6/2002 | Prasad et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0164280 A1* | 8/2004 | Singla ............ C04B 35/016 252/500 |
| 2004/0221722 A1 | 11/2004 | Prasad et al. |
| 2005/0037299 A1 | 2/2005 | Gottzmann |
| 2005/0048343 A1* | 3/2005 | Thirukkvalur ........ H01M 8/023 429/454 |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0259252 A1* | 11/2007 | Koc ............... H01M 4/9016 429/489 |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0011323 A1* | 1/2009 | Guan ............ H01M 4/8885 429/469 |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2010/0015014 A1 | 1/2010 | Gopalan et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0193104 A1 | 8/2010 | Ryu et al. |
| 2010/0200418 A1 | 8/2010 | Licht |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0141672 A1 | 6/2011 | Farley et al. |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0195342 A1* | 8/2011 | Luo ............... B01D 53/228 429/495 |
| 2011/0200520 A1 | 8/2011 | Ramkumar et al. |
| 2011/0240924 A1 | 10/2011 | Repasky |
| 2011/0253551 A1 | 10/2011 | Lane et al. |
| 2012/0000360 A1 | 1/2012 | Richet et al. |

(56) References Cited

U.S. PATENT DOCUMENTS

| | | | |
|---|---|---|---|
| 2012/0067060 A1 | 3/2012 | Greeff | |
| 2013/0009100 A1 | 1/2013 | Kelly et al. | |
| 2013/0009102 A1 | 1/2013 | Kelly et al. | |
| 2013/0015405 A1 | 1/2013 | Quintero | |
| 2013/0072374 A1 | 3/2013 | Lane et al. | |
| 2013/0072375 A1 | 3/2013 | Lane et al. | |
| 2013/0156958 A1 | 6/2013 | Belov et al. | |
| 2014/0044604 A1 | 2/2014 | Lane et al. | |
| 2014/0056774 A1 | 2/2014 | Kelly et al. | |
| 2014/0060643 A1 | 3/2014 | Martin et al. | |
| 2014/0183866 A1 | 7/2014 | Kromer et al. | |
| 2014/0206779 A1 | 7/2014 | Lackner | |
| 2014/0271393 A1* | 9/2014 | Nazarpoor | B01J 23/002 422/177 |
| 2014/0319424 A1 | 10/2014 | Chakravarti et al. | |
| 2014/0319427 A1 | 10/2014 | Chakravarti et al. | |
| 2014/0323597 A1 | 10/2014 | Stuckert et al. | |
| 2014/0323598 A1 | 10/2014 | Chakravarti et al. | |
| 2014/0323599 A1 | 10/2014 | Chakravarti et al. | |
| 2015/0096506 A1* | 4/2015 | Kelly | B01J 8/067 122/32 |
| 2015/0098868 A1* | 4/2015 | Kelly | B01J 8/067 422/115 |
| 2015/0098872 A1* | 4/2015 | Kelly | B01J 8/067 422/187 |

FOREIGN PATENT DOCUMENTS

| | | |
|---|---|---|
| EP | 0989093 A2 | 3/2000 |
| EP | 1504811 A1 | 2/2005 |
| EP | 1743694 A1 | 1/2007 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1348375 | 3/1974 |
| WO | WO 9842636 | 10/1998 |
| WO | WO 0017418 | 3/2000 |
| WO | WO 0109059 A1 | 2/2001 |
| WO | WO 2007060141 | 5/2007 |
| WO | WO 2007086949 | 8/2007 |
| WO | WO 2008024405 | 2/2008 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013062413 A1 | 5/2013 |
| WO | WO 2013089895 A1 | 6/2013 |
| WO | WO 2014074559 A1 | 5/2014 |
| WO | WO 2014077531 A1 | 5/2014 |
| WO | WO 2014107707 A2 | 7/2014 |
| WO | WO 2014176022 A1 | 10/2014 |

OTHER PUBLICATIONS

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010, 85 pgs.

Zhu et al.; Development of Interconnect Materials for Solid Oxide Fuel Cells; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPowSour. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC pp. 1-10.

Friedmann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2, Energy Convers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768, ISSN: 0167-2738.

* cited by examiner

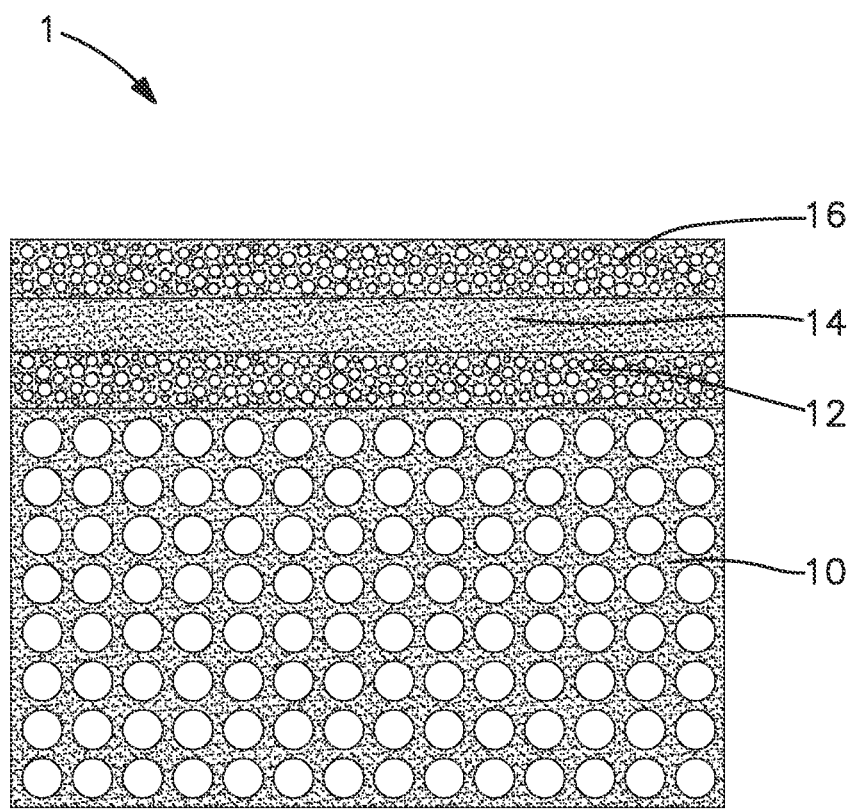

COMPOSITE OXYGEN TRANSPORT MEMBRANE

CROSS REFERENCE TO RELATED APPLICATIONS

This application is a continuation of prior U.S. patent application Ser. No. 13/644,666, filed on Oct. 4, 2012, which claims priority from U.S. Provisional Patent Application Ser. No. 61/576,108, filed on Dec. 15, 2011, which is incorporated herein by reference.

U.S. GOVERNMENT RIGHTS

This invention was made with Government support under Cooperative Agreement No. DE-FC26-07NT43088, awarded by the United States Department of Energy. The Government has certain rights in this invention.

FIELD OF THE INVENTION

The present invention relates to a method of forming a composite oxygen transport membrane and the composite oxygen transport membrane itself in which a porous fuel oxidation layer and a dense separation layer and optionally, a porous surface activation layer are formed on a porous support from mixtures of $(Ln_{1-x}A_x)_wCr_{1-y}B_yO_{3-\delta}$ and a doped zirconia. More particularly, the present invention relates to such a method in which the porous fuel oxidation layer and the optional porous surface exchange layer are formed $(La_{1-x}Ca_x)_wCr_{1-y}Mn_yO_{3-\delta}$ and the doped zirconia, the dense separation layer is formed from $(La_{1-x}Sr_x)_wCr_{1-y}Fe_yO_{3-\delta}$ and the doped zirconia and all of such layers are sintered in air without the use of pore formers in either of the porous layers.

BACKGROUND

Oxygen transport membranes function to separate oxygen from air or other oxygen containing gases by transporting oxygen ions through a material that is capable of conducting oxygen ions and electrons at elevated temperatures. When a partial pressure difference of oxygen is applied on opposite sides of such a membrane, oxygen ions will ionize on one surface of the membrane and emerge on the opposite side of the membrane and recombine into elemental oxygen. The free electrons resulting from the combination will be transported back through the membrane to ionize the oxygen. The partial pressure difference can be produced by providing the oxygen containing feed to the membrane at a positive pressure or by combusting a fuel or other combustible substance in the presence of the separated oxygen on the opposite side of the membrane or a combination of the two methods. It is to be noted that the combustion will produce heat that is used to raise the temperature of the membrane to an operational temperature at which the oxygen ion transport can occur and also, to supply heat to an industrial process that requires heating. Moreover, whether or not heat is required for a process, the combustion itself can produce products such as synthesis gases by means of partial oxidation of a fuel or other combustible substance occasioned as a result of the combustion.

Oxygen transport membranes can utilize a single phase mixed conducting material such as a perovskite to conduct the electrons and transport the oxygen ions. While perovskite materials can exhibit a high oxygen flux, such materials tend to be very fragile under operational conditions involved where a fuel or other combustible substance is used to produce the partial pressure difference. This is because the perovskite will have a variable stoichiometry with respect to oxygen. In air, it will have one value and in the presence of a fuel that is undergoing combustion it will have another value. The end result is that at the fuel side, the material will tend to expand relative to the air side and a dense layer will therefore, tend to fracture. In order to overcome this problem, a mixture of materials can be used in which a primarily ionic conductor is provided to conduct the oxygen ions and a primarily electronic conductor is used to conduct the electrons. The primarily ionic conductor can be a fluorite such as a stabilized zirconia and the primarily electronic conductor can be a perovskite. Where the primarily ionic conductor is a fluorite, this chemical expansion is less problematical.

Typically, oxygen transport membranes are composite, also known as supported thick film, structures that include a dense separation layer composed of the two phases of materials, a porous fuel oxidation layer located between the dense separation layer and a porous support layer and a porous surface activation layer located opposite to the porous fuel oxidation layer and on the other side of the dense separation layer. All of these layers are supported on a porous support, or porous supporting substrate. The dense separation layer is where the oxygen ion transport principally occurs. Although defects in the dense separation layer can occur that enable the passage of gas through such layer, it is intended to be gas tight and therefore, not porous. Both the porous surface activation layer and the porous fuel oxidation layers are "active", that is, they are formed from materials that permit the transport of oxygen ions and the conduction of electrons. Since the resistance to oxygen ion transport is dependent on the thickness of the membrane, the dense separation layer is made as thin as possible and therefore must be supported in any case. The porous fuel oxidation layer enhances the rate of fuel oxidation by providing a high surface area where fuel can react with oxygen or oxygen ions. The oxygen ions diffuse through the mixed conducting matrix of this porous layer towards the porous support and react with the fuel that diffuses inward from the porous support into the porous fuel oxidation layer. The porous surface activation layer enhances the rate of oxygen incorporation by enhancing the surface area of the dense separation layer while providing a path for the resulting oxygen ions to diffuse through the mixed conducting oxide phase to the dense separation layer and for oxygen molecules to diffuse through the open pore space to the dense separation layer. The surface activation layer therefore, reduces the loss of driving force in the oxygen incorporation process and thereby increases the achievable oxygen flux. Preferably, the porous fuel oxidation layer and the porous surface exchange layer are formed from the same electronic and ionic phases as the dense separation layer to provide a close thermal expansion match between the layers.

U.S. Pat. No. 7,556,676 describes a composite oxygen ion transport membrane. In order to form a dense, gas impermeable dual phase membrane layer from these materials the membrane needs to contain vanadium, and be sintered in a furnace atmosphere containing a mixture of hydrogen and nitrogen. From a cost perspective for high volume manufacturing it would be preferable to sinter in air. From an environmental viewpoint it would be beneficial to eliminate vanadium. The materials of both the porous intermediate fuel oxidation layer and the porous air side surface exchange layers described in this patent have shown a tendency to densify during prolonged usage at high temperatures. Densification of these layers results in degradation of oxygen flux through the membrane.

As will be discussed the present invention provides a method of manufacturing a composite oxygen ion transport membrane and the membrane structure resulting from such manufacture that among other advantages incorporates materials that enable fabrication to be accomplished in a more cost effective manner than in the prior art and also, will be more durable than prior art membranes.

SUMMARY OF THE INVENTION

The present invention provides a method of producing an oxygen ion composite membrane. In accordance with such method, a first layer is formed on a porous support containing a first mixture of particles of $(Ln_{1-x}A_x)_w Cr_{1-y}B_y O_{3-\delta}$ and doped zirconia and that does not contain or is substantially free of pore formers. Ln is La, Y, Pr, Ce or Sm, A is Ca, B is Fe, Mn, Co, Al, Ti or combinations thereof, w is 0.9-1.1, x is 0.1-0.4 and y is 0.1-0.6. The first mixture contains the $(Ln_{1-x}A_x)_w Cr_{1-y}B_y O_{3-\delta}$ and the doped zirconia such that when sintered, first layer will contain $(Ln_{1-x}A_x)_w Cr_{1-y}B_y O_{3-\delta}$ and the doped zirconia in a first volume ratio of between 2 to 3 and 4 to 1 on a volume percentile basis. A second layer is formed on the first layer that contains a second mixture of particles of $(Ln_{1-x}A_x)_w Cr_{1-y}B_y O_{3-\delta}$ and the doped zirconia and that does not contain or is substantially free of pore formers. In such mixture, Ln is La, Y, Pr, Ce or Sm, A is Sr, and B is Fe, Mn, Co, Al, Ti or combinations thereof, w is 0.9-1.1, x is 0.1-0.3 and y is 0.1-0.6. The second mixture contains the $(Ln_{1-x}A_x)_w Cr_{1-y}B_y O_{3-\delta}$ and the doped zirconia such that when sintered, second layer will contain the $(Ln_{1-x}A_x)_w Cr_{1-y}B_y O_{3-\delta}$ and the doped zirconia in a second volume ratio of between 1 to 4 and 3 to 2 on a volume percentile basis. The first layer and the second layer and porous support are heated so that said first layer partially sinters into a porous mass containing the first mixture of particles, thereby to provide a porous fuel oxidation layer and the second layer fully sinters into a densified mass containing the second mixture of particles, thereby to provide a dense separation layer.

As can be appreciated from the above discussion, since the composite membrane of the present invention is directly formed by sintering the layers in air, special sintering atmospheres do not have to be utilized. Furthermore, the porous layers do not use or is substantially free of pore formers. Both of these factors help to reduce the costs involved in fabricating such a composite membrane of the present invention. It is to be noted here that the production of a porous structure without the use of pore formers is a particularly unexpected result. In this regard, if $(Ln_{1-x}A_x)_w Cr_{1-y}B_y O_{3-\delta}$ is heated alone, it will sinter into a dense mass and will not be porous. The same will occur if a doped zirconia is sintered. However, if these materials are mixed together and then heated, a porous mass will result. Since such porous structure does not depend on pore formers and is formed at a temperature significantly higher than the membrane operation temperature during use, the pores will be less likely to close over time and therefore, the durability and life of the membrane will increase over prior art membranes. Furthermore, among other advantages of the present invention, Vanadium is not used and since all layers incorporate similar $ABO_3$ materials, there will be a close thermal expansion match between layers.

In addition to the foregoing, a third layer can be formed on the second layer containing a third mixture of particles of $(Ln_{1-x}A_x)_w Cr_{1-y}B_y O_{3-\delta}$ and the doped zirconia and that does not contain or is substantially free of pore formers. Again, for such mixture, Ln is La, Y, Pr, Ce or Sm, A is Ca, B is Fe, Mn, Co, Al, Ti or combinations thereof, w is 0.9-1.1, x is 0.1-0.4 and y is 0.1-0.6. The third mixture has a third volume ratio of the $(Ln_{1-x}A_x)_w Cr_{1-y}B_y O_{3-\delta}$ and the doped zirconia such that, when sintered, the third layer will contain the $(Ln_{1-x}A_x)_w Cr_{1-y}B_y O_{3-\delta}$ and the doped zirconia in a third volume ratio of between 1 to 3 and 3 to 1 on a volume percentile basis. The third layer is sintered in air at a temperature of >1300° C. such that the third layer is porous. Furthermore, the first mixture can also contain particles of $Ce_{1-x}A_x O_2$ where A is Gd, Sm, Y, La, Nb, Zr and x is 0.1-0.4. The purpose of such particles is to catalyze the oxidation of a fuel introduced into the porous support. Preferably, the doped zirconia is 10 mol % Scandia 1 mol % Yttria doped Zirconia (10Sc1YSZ).

The $(Ln_{1-x}A_x)_w Cr_{1-y}B_y O_{3-\delta}$ within the first mixture of particles and the third mixture of particles can be $(Ln_{1-x}A_x)_w Cr_{1-y}B_y O_{3-\delta}$, where x is 0.2 and y is 0.5. The $(Ln_{1-x}A_x)_w Cr_{1-y}B_y O_{3-\delta}$ and 10Sc1YSZ within the second mixture of particles can be $(Ln_{1-x}Sr_x)_w Cr_{1-y}Fe_y O_{3-\delta}$, where x is 0.2 and y is 0.5. Moreover, the sintered porous support is formed from a stabilized zirconia or a mixture of MgO and $MgAl_2O_4$.

Preferably, the first volume ratio is 3 to 2, the second volume ratio is 2 to 3 and the third volume ratio is 1 to 1. The porous support can be of tubular configuration. In a specific embodiment, the porous support is formed of 3 mol % Yttria Stabilized Zirconia (3YSZ) and fired at a temperature of 1000° C. so that it is not fully sintered prior to forming the first layer on the porous support. In such embodiment, the first layer, after having been formed on the porous support, is fired at a temperature of 950° C. to remove binder from the first mixture. The second layer is then formed on the first layer. The first layer, the second layer and the porous support are then sintered at a temperature of 1400° C. Additionally, the third layer can be sintered at a temperature of between 1300° C. and 1400° C. Alternatively, the first layer, the second layer and the third layer are sintered at a temperature of 1400° C. It is also possible that the substrate can be fully sintered such that it will have no further shrinkage prior to application of the subsequent layers. In this example the subsequent layers are formulated such that the second layer will fully densify through a process of constrained sintering. In any embodiment of the present invention, the first layer, the second layer and the third layer are formed by slurry coating.

In yet another aspect, the present invention provides a method of producing a porous material. In such aspect, a first mixture of particles of $(Ln_{1-x}A_x)_w Cr_{1-y}B_y O_{3-\delta}$ and doped zirconia and that does not contain or is substantially free of pore formers is provided. Ln is La, Y, Pr, Ce or Sm, A is Ca, B is Fe, Mn, Co, Al, Ti, or combinations thereof, w is 0.9-1.1, x is 0.1-0.4 and y is 0.1-0.6. The first mixture has a first volume ratio of the $(Ln_{1-x}A_x)_w Cr_{1-y}B_y O_{3-\delta}$ and the doped zirconia such that when sintered, the first layer will contain the $(Ln_{1-x}A_x)_w Cr_{1-y}B_y O_{3-\delta}$ and the doped zirconia in a first volume ratio of between 2 to 3 and 4 to 1 on a volume percentile basis. The mixture is sintered in air at a temperature of >1300° C. to form the porous material. Preferably, the doped zirconia is 10 mol % Scandia 1 mol % Yttria doped Zirconia. Such a porous material can have a wider use than in composite oxygen ion transport membranes where robust supporting structures are required.

The present invention also provides an oxygen ion composite membrane that comprises first and second layers on a porous support providing a porous fuel oxidation layer and a dense separation layer, respectively. Each of the first and second layers contain a mixture of $(Ln_{1-x}A_x)_wCr_{1-y}B_yO_{3-\delta}$ and doped zirconia, where for the first of the layers, Ln is La, Y, Pr, Ce or Sm, A is Ca, B is Fe, Mn, Co, Al, Ti or combinations thereof, w is 0.9-1.1, x is 0.1-0.4 and y is 0.1-0.6 and for the second of the layers, Ln is La, Y, Pr, Ce or Sm, A is Sr, and B is Fe, Mn, Co, Al, Ti or combinations thereof, w is 0.9-1.1, x is 0.1-0.3 and y is 0.1-0.6. The first of the layers contains the $(Ln_{1-x}A_x)_wCr_{1-y}B_yO_{3-\delta}$ and the doped zirconia in a first volume ratio of between 2 to 3 and 4 to 1 on a volume percentile basis. The second of the layers contains the $(Ln_{1-x}A_x)_wCr_{1-y}B_yO_{3-\delta}$ and the doped zirconia in a second volume ratio of between 1 to 4 and 3 to 2 on a volume percentile basis.

A third layer can be situated on the second layer to form a porous surface exchange layer and that also contains the mixture of $(Ln_{1-x}A_x)_wCr_{1-y}B_yO_{3-\delta}$ and the doped zirconia. In such layer, Ln is La, Y, Pr, Ce or Sm, A is Ca, B is Fe, Mn, Co, Al, or combinations thereof, w is 0.9-1.1, x is 0.1-0.4 and y is 0.1-0.6. The third layer contains the $(Ln_{1-x}A_x)_wCr_{1-y}B_yO_{3-\delta}$ and the doped zirconia in a third volume ratio of between 1 to 3 and 3 to 1 on a volume percentile basis.

The first layer can also contain particles of $Ce_{1-x}A_xO_2$ where A is Gd or Sm and x is 0.1-0.4. Further, the doped zirconia can be 10Sc1YSZ. Preferably, the $(Ln_{1-x}A_x)_wCr_{1-y}B_yO_{3-\delta}$ within the first layer and the third layer is $(Ln_{1-x}Ca_x)_wCr_{1-y}Mn_yO_{3-\delta}$, where x is 0.2 and y is 0.5. The $(Ln_{1-x}A_x)_wCr_{1-y}B_yO_{3-\delta}$ within the second layer is preferably $(Ln_{1-x}Sr_x)_wCr_{1-y}Fe_yO_{3-\delta}$, where x is 0.2 and y is 0.5; and the sintered porous support is preferably formed from stabilized zirconia or a mixture of MgO and $MgAl_2O_4$. Additionally, preferably, the first volume ratio is 3 to 2, the second volume ratio is 2 to 3 and the third volume ratio is 1 to 1. In any embodiment of the present invention and in any aspect, the porous support is of tubular configuration.

BRIEF DESCRIPTION OF THE DRAWINGS

While the specification concludes with claims distinctly pointing out the subject matter that Applicants regard as their invention, it is believed that the invention will be better understood when taking in connection with the accompanying drawings in which the sole FIGURE is a cross-sectional schematic illustration of a composite oxygen ion transport membrane.

DETAILED DESCRIPTION

With reference to the FIGURE, a sectional, schematic view of a composite oxygen transport membrane 1 is illustrated. Composite oxygen transport membrane 1 has a porous support layer 10. Applied to the porous support layer 10 is a first layer 12, a second layer 14 and a third layer 16. The composite oxygen transport membrane is specifically designed to function in an environment in which a fuel or other combustible substance is introduced to the porous support layer 10, on the side opposite to the first, second and third layer 12, 14 and 16, and subjected to combustion supported by permeated oxygen to both provide the partial pressure difference necessary to drive oxygen ion transport and also to heat the membrane to an operational temperature at which oxygen ion transport will occur. As such, the first layer 12, which, as will be discussed, may optionally include a combustion catalyst, serves as a porous fuel oxidation layer at which combustion of the fuel or other combustible substance is promoted with the catalyst. In this regard, the term "fuel" when used in connection with this layer, both herein and in the claims, is not intended to be limiting, but rather, to indicate and include any substance that can be oxidized through permeation of oxygen through the membrane. The second layer 14 is the active layer at which oxygen ion transport principally occurs and as such, serves as dense separation layer that is impervious to gas, but allows oxygen ion transport. The third layer 16 serves to initially reduce the oxygen and thus serves as a porous surface activation layer. Each of the first layer 12, the second layer 14 and the third layer 16 after heating and sintering will preferably each have a thickness of 20 µm+/−10 µm.

The porous support layer 10 could be formed from partially stabilized zirconia oxide e.g. 3, 4 or 5 mol % yttria stabilized zirconia or fully stabilized zirconia e.g. 15 mol % calcia stabilized zirconia. Alternatively the porous substrate can be formed from a mixture of MgO and $MgAl_2O_4$. Alternatively the porous substrate could be a porous metal. In this regard, although not part of the present invention, as would be appreciated by those skilled in the art, porous support layer 10 should provide as open an area as possible while still being able to be structurally sound in its supporting function. Porous support structures for application in composite oxygen transport membranes are best characterized in terms of their porosity, strength and effective oxygen diffusivity. The porous support forms the mechanical support for the "active" membranes layers so should have sufficient strength at high temperatures. A typical support structure in this application would have total porosity in the range 20-50%. An important property of the porous substrate is the ability to allow gaseous species to readily move through the porous support structure to and from the membrane 'active' layers e.g. $H_2$, CO, $H_2O$ and CO2. The ability of the substrate to allow gaseous transport can be characterized as an effective oxygen diffusivity, $D_{eff\,O2-N2}$. For this application it has been determined that a $D_{eff\,O2-N2}$ more than 0.005 $cm^2$/s measured at room temperature is preferred. The porous substrate should also possess a thermal expansion coefficient not more than 10% different from that of the membrane 'active' layers between room temperature and membrane operation temperature.

A stabilized zirconia, namely, $Zr_{1-x-y}A_xB_yO_{2-\delta}$ is a common material in all three "active" membrane layers, namely, the first layer 12, the second layer 14 and the third layer 16. As mentioned above in all of these layers oxygen ion transport occurs and as such, are "active". In order to generate industrially relevant levels of oxygen ion conductivity, A and B are typically Sc, Y, Ce, Al or Ca. Preferably, such stabilized zirconia has a composition given by formula: $Zr_{0.802}Sc_{0.180}O_{2-\delta}$, often noted as 10Sc1YSZ in literature associated with this class of membrane. However it should be noted that many different combinations of Sc, Y, Ce, Al, Ca or other elements can be substituted to achieve the same end.

Turning first to the first layer 12, this layer is formed from a first mixture of particles of $(Ln_{1-x}A_x)_wCr_{1-y}B_yO_{3-\delta}$ and 10Sc1YSZ and that does not contain or is substantially free of pore formers. In this layer, Ln is La, Y, Pr, Ce or Sm, A is Ca, B can be Mn, Fe, Co Al, Ti or combinations thereof; w is 0.9 to 1.1, x is 0.1-0.4 and y is 0.1-0.6. The preferred composition of material for this layer is $(La_{0.8}Ca_{0.2})_{0.95}Cr_{0.5}Mn_{0.5}O_{3-\delta}$. The $(Ln_{1-x}A_x)_wCr_{1-y}B_yO_{3-\delta}$ and 10Sc1YSZ should be present within a first volume ratio of between 2 to 3 and 4 to 1 on a volume percentage basis after the first layer 12 has been sintered. The preferred first volume ratio is 3 to 2.

If either of these materials $(Ln_{1-x}A_x)_wCr_{1-y}B_yO_{3-\delta}$ or 10Sc1YSZ is sintered in air, they will both sinter to a high density. The $(Ln_{1-x}A_x)_wCr_{1-y}B_yO_{3-\delta}$ will sinter to a high density in air due to a liquid phase sintering mechanism involving precipitation of $CaCrO_4$. In fact, the preferred composition, $(La_{0.8}Ca_{0.2})_{0.95}Cr_{0.5}Mn_{0.5}O_{3-\delta}$ sinters readily to full density at temperatures of 1350-1400° C. in air, as do many other such materials where A is Ca and w is 0.9-1.1. As a single phase material, 10Sc1YSZ also sinters readily to full density at temperatures of 1400° C. in air. It should therefore be expected that when mixing both these materials together that the mixture would also readily densify in air at temperatures approaching 1400° C. However, it has been found when these two materials are mixed, quite unexpectedly, the combination of the two materials had very poor sintering characteristics and remained substantially porous (>30% porosity) after sintering at 1400° C. in air. This is quite surprising and allows the composite oxygen ion transport membrane to be sintered in a very much simplified manner in connection with the traditional processing that required pore formers. As mentioned above, one of the key functions of the intermediate porous fuel oxidation layer is that it needs to remain porous for years of operation in order that the membrane does not degrade in oxygen flux performance. This layer, where the fuel is oxidized, will see some of the highest temperatures in the membrane. The fact that this combination of materials does not densify at temperatures of up to 1400° C. in air make them excellent candidates for the fuel oxidation layer which needs to remain porous for tens of thousands of hours at 1000° C. Moreover, as indicated above, the combination of such materials can have other applications beyond composite oxygen ion transport membranes. For example, such a structure could be used in a catalyst support.

As mentioned above a catalyst can be present within the first layer 12. In this regard, first layer 12 can contain particles of $Ce_{1-x}A_xO_2$ where A is Gd or Sm, Y, La, Zr. These particles can be added to the first mixture before the layer is formed or impregnated as a solution after forming the layer. Such catalyst would be used where it is desirable to promote combustion of such combustible substances as natural gas or synthesis gas.

The second layer 14 is formed of a second mixture of particles of $(Ln_{1-x}A_x)_wCr_{1-y}B_yO_{3-\delta}$ and 10Sc1YSZ. The function of the second layer 14 is to be a gas separation layer that is impervious to gas molecules but should is conductive to oxygen ions and electrons. There are other materials that could serve such a purpose. However, for the $(Ln_{1-x}A_x)_wCr_{1-y}B_yO_{3-\delta}$ component, Ln is preferably La, A is preferably Sr, B is preferably Fe, x is 0.1-0.3 and y is 0.1-0.6 and w is 0.9-1.1. The preferred composition of material for this layer is $(La_{0.8}Sr_{0.2})_{0.95}Cr_{0.5}Fe_{0.5}O_{3-\delta}$. Unlike the first layer 12, however, A cannot be calcium in that as also discussed above, such a material will be porous upon sintering. Although this composition is very similar to that of the material selected for both the first layer 12 and the third layer to be discussed, differing only in composition in that in place of Ca, Sr is used, the sintering and densification properties are markedly different. This layer will sinter dense at 1400° C. in air. Within the second mixture of particles, the $(Ln_{1-x}A_x)_wCr_{1-y}B_yO_{3-\delta}$ and 10Sc1YSZ should be present within a second volume ratio of between 1 to 4 and 3 to 2 on a volume percentage basis after the first layer 12 has been sintered. The preferred second volume ratio is about 2 to 3.

The third layer 16, that serves as the porous surface exchange layer is formed of a third mixture of particles of $(Ln_{1-x}A_x)_wCr_{1-y}B_yO_{3-\delta}$ and 10Sc1YSZ. In this layer, Ln is La, Y, Pr, Ce or Sm, A is Ca or Sr but preferably Ca, B can be Mn, Fe, Co Al, Ti or combinations thereof; w is 0.9-1.1, x is 0.1-0.4 and y is 0.1-0.6. The preferred composition of material for this layer is currently the same as that deployed in the first layer 12, namely, and $(La_{0.8}Ca_{0.2})_{0.95}Cr_{0.5}Mn_{0.5}O_{3-\delta}$. This material is preferred for the same reasons as in the first layer 12 (i.e.) it will not sinter dense in air at temperatures of up to 1400° C. when mixed with 10Sc1YSZ or other zirconia based compositions. The $(Ln_{1-x}A_x)_wCr_{1-y}B_yO_{3-\delta}$ and 10Sc1YSZ should be present within a third volume ratio of between 1 to 3 and 3 to 1 on a volume percentage basis after the first layer 12 has been sintered. The preferred third volume ratio is about 1 to 1.

As an example of forming the composite oxygen ion transport membrane 1, the and $(La_{0.8}Sr_{0.2})_{0.95}Cr_{0.5}Fe_{0.5}O_{3-\delta}$ for the second layer can be obtained from NexTech Materials, Ltd., Lewis Center, Ohio and and $Zr_{0.802}Sc_{0.180}Y_{0.018}O_{2-\delta}$ can be obtained from Daiichi Kigenso Kagaku Kogyo Co., Ltd, Osaka, Japan through their US agent Sojitz, Ltd, in New York, USA. The perovskite phase and $(La_{0.8}Sr_{0.2})_{0.95}Cr_{0.5}Fe_{0.5}O_{3-\delta}$ can have a particle size D50 in the range 0.3-0.35 μm, the $Zr_{0.802}Sc_{0.180}Y_{0.018}O_{2-\delta}$ should have a D50 of <0.6 μm. To fabricate a 120 gram batch of dense gas separation layer slurry, 51 g of and $(La_{0.8}Sr_{0.2})_{0.95}Cr_{0.5}Fe_{0.5}O_{3-\delta}$ is mixed with 69 g of $Zr_{0.802}Sc_{0.180}Y_{0.018}O_{2-\delta}$ 60 g Ferro B73210 binder, 255 g Toluene and 1200 g of 1.5 mm diameter YSZ milling media in a 32 oz NALGENE bottle. The mixture is milled for about 2.25 hours or until the particle size of the mixture is in the range 0.3-0.35 μm. The material for first layer 12, and $(La_{0.8}Ca_{0.2})_{0.95}Cr_{0.5}Mn_{0.5}O_{3-\delta}$, is also obtained from NexTech Materials, Ltd., Lewis Center, Ohio and the $Zr_{0.802}Sc_{0.180}Y_{0.018}O_{2-\delta}$ can also be obtained from Daiichi Kigenso Kagaku Kogyo Co. Ltd, Osaka, Japan through their US agent Sojitz, Ltd, in New York. The perovskite phase and $(La_{0.8}Ca_{0.2})_{0.95}Cr_{0.5}Mn_{0.5}O_{3-\delta}$ is specified as having a particle size D50 in the range 0.3-0.35 μm, the $Zr_{0.802}Sc_{0.180}Y_{0.018}O_{2-\delta}$ should have a D50 of <0.6 μm as received. In order to fabricate a 120 g batch of dense gas separation layer slurry, 75 g of and $(La_{0.8}Ca_{0.2})_{0.95}Cr_{0.5}Mn_{0.5}O_{3-\delta}$ is mixed with 45 g of $Zr_{0.802}Sc_{0.180}Y_{0.018}O_{2-\delta}$, 60 g Ferro B73210 binder, 255 g Toluene and 1200 g of 1.5 mm diameter YSZ milling media in a 32 oz Nalgene bottle. The mixture is milled for about 2.25 hours or until the particle size of the mixture is in the range 0.3-0.35 μm. Additionally a small amount of e.g. $Ce_{0.9}Gd_{0.1}O_{1.95}$ oxidation catalyst can be added as a powder to the mixture during fabrication of this slurry. The third layer 16 can be formed in exactly the same manner as the first layer 12.

In order to form a composite oxygen transport membrane 1 from these two slurries the slurries are deposited on a porous support 10 by slurry coating followed by firing in air. The porous support 10 can be of tubular architecture and fabricated by an extrusion process. Although the porous support 10 can be fully sintered, it can first be fired at a low temperature (e.g.) 1000° C. after green forming such that some residual shrinkage remains when the coated substrate is fired again at higher temperatures. The second layer 12 is then deposited on the surface of the porous support layer 10 and the thickness is controlled by the speed at which the supporting substrate is dipped into the slurry. The second layer 12 is allowed to dry and can be optionally fired at a temperature of 950° C. in air to remove the binder. The second layer 14 is then applied on top of the first layer 12 by dipping the component into the slurry formed for such layer and allowed to dry. The three layers are then fired together at a higher temperature of 1400° C. in air. After this, the third layer 16 is applied by slurry coating the sintered three layer membrane structure and firing at a temperature of >1300° C. in air. The third layer 16 could also be applied after drying of the dense layer, 14 and then co-firing all three active layers 12,14,16 together in one high temperature sintering step at >1300° C. in air. Combining the high temperature sintering steps for these three layers leads to lower manufacturing costs than can be achieved when using separate high temperature sintering steps for each of the three layers.

While the present invention has been described with reference to a preferred embodiment, as would occur to those skilled in the art, numerous changes, additions and omission may be made without departing from the spirit and scope of the present invention as set forth in the appended claims.

What is claimed is:

1. A method of producing an oxygen ion composite membrane comprising:
   forming a first layer on a porous support, the first layer comprising a first mixture of particles of $(Ln_{1-x}A_x)_wCr_{1-y}B_yO_{3-\delta}$ and doped zirconia where Ln is La, Y, Pr, Ce or Sm; A is Ca or Sr; B is Fe, Mn, Co, Al, Ti or combinations thereof; w is between about 0.9 and 1.1; x is between about 0.1 and 0.4 and y is between about 0.1 and 0.6;
   forming a second layer on the first layer, the second layer comprising a second mixture of particles of $(Ln_{1-x}A_x)_wCr_{1-y}B_yO_{3-\delta}$ and the doped zirconia, where Ln is La, Y, Pr, Ce or Sm; A is Sr; and B is Fe, Mn, Co, Al, Ti or combinations thereof; w is between about 0.9 and 1.1; x is between about 0.1 and 0.4 and y is between about 0.1 and 0.6; and
   sintering the porous support, the first layer and the second layer in air at temperatures of greater than about 1300° C. to produce the oxygen ion composite membrane;
   wherein the produced oxygen ion composite membrane comprises the porous support, a porous fuel oxidation layer of the first layer and a dense separation layer of the second layer.

2. The method of claim 1 wherein the first layer is substantially free of pore formers.

3. The method of claim 1 wherein the sintered first layer further comprises $(Ln_{1-x}A_x)_wCr_{1-y}B_yO_{3-\delta}$ and doped zirconia in a first volume ratio of between 2 to 3 and 4 to 1 on a volume percentile basis.

4. The method of claim 1 wherein the sintered second layer further comprises $(Ln_{1-x}A_x)_wCr_{1-y}B_yO_{3-\delta}$ and doped zirconia in a second volume ratio of between 1 to 4 and 3 to 2 on a volume percentile basis.

5. The method of claim 1 further comprising a step of heating or firing the porous support to a low temperature so that it is not fully sintered prior to forming the first layer on the porous support.

6. The method of claim 5 further comprising a step of heating or firing the first layer after having been formed on the porous support at a temperature greater than about 950° C. to remove any binder from the first mixture.

7. The method of claim 6 wherein the steps of sintering the porous support, the first layer and the second layer in air at temperatures of greater than about 1300° C. to produce the oxygen ion composite membrane are performed after heating or firing the porous support and the first layer.

8. The method of claim 1 wherein B is a combination of Fe and Co.

9. The method of claim 1 wherein within the second layer x is 0.1 to 0.3.

10. The method of claim 1 further comprising the steps of:
    forming a third layer on the second layer, the third layer comprising a third mixture of particles of $(Ln_{1-x}A_x)_wCr_{1-y}B_yO_{3-\delta}$ and doped zirconia, where Ln is La, Y, Pr, Ce or Sm; A is Ca or Sr; B is Fe, Mn, Co, Al, Ti or combinations thereof; w is between about 0.9 and 1.1; x is between about 0.1 and 0.4 and y is between about 0.1 and 0.6;
    wherein the oxygen ion composite membrane comprises the porous support, the porous fuel oxidation layer, the dense separation layer, and a porous surface exchange layer of the third layer.

11. The method of claim 10 wherein the third layer contains $(Ln_{1-x}A_x)_wCr_{1-y}B_yO_{3-\delta}$ and doped zirconia in a third volume ratio of between 1 to 3 and 3 to 1 on a volume percentile basis.

12. The method of claim 10 further comprising a step of sintering the third layer after having been formed on the second layer, wherein the sintering is performed in air at a temperature of greater than about 1300° C.

13. The method of claim 11 wherein the third volume ratio is about 1 to 1.

14. The method of claim 1 wherein the first layer further comprises $Ce_{1-x}A_xO_2$, where A is Gd or Sm; and x is between about 0.1 and 0.4.

15. The method of claim 1 wherein the doped zirconia is 10 mol % Scandia and 1 mol % Yttria Stabilized Zirconia (10Sc1YSZ).

16. The method of claim 1 wherein the porous support is formed from doped zirconium oxide or a mixture of MgO and $MgAl_2O_4$.

17. The method of claim 3 wherein the first volume ratio is about 3 to 2.

18. The method of claim 4 wherein the second volume ratio is about 2 to 3.

19. The method of claim 1 wherein the porous support is of a tubular configuration.

20. The method of claim 10 wherein first layer, the second layer, and the third layer are formed by a slurry coating process.

21. An oxygen ion composite membrane comprising:
    a porous support;
    a first layer disposed on the porous support providing a porous fuel oxidation layer, the first layer comprising a mixture of $(Ln_{1-x}A_x)_wCr_{1-y}B_yO_{3-\delta}$ and doped zirconia, where Ln is La, Y, Pr, Ce or Sm; A is Ca or Sr; B is Fe, Mn, Co, Al, Ti or combinations thereof; w is between about 0.9 and 1.1; x is between about 0.1 and 0.4 and y is between about 0.1 and 0.6; wherein the first layer further comprises $(Ln_{1-x}A_x)_wCr_{1-y}B_yO_{3-\delta}$ and doped zirconia in a first volume ratio of between about 2 to 3 and 4 to 2 on a volume percentile basis;
    a second layer disposed on the first layer and providing a dense separation layer, the second layer comprising a mixture of $(Ln_{1-x}A_x)_wCr_{1-y}B_yO_{3-\delta}$ and doped zirconia, where Ln is La, Y, Pr, Ce or Sm; A is Sr; and B is Fe, Mn, Co, Al or combinations thereof; w is between about 0.9 and 1.1; x is between about 0.1 and 0.4 and y is between about 0.1 and 0.6; wherein the second layer further comprises $(Ln_{1-x}A_x)_wCr_{1-y}B_yO_{3-\delta}$ and doped zirconia in a second volume ratio of between about 1 to 4 and 3 to 2 on a volume percentile basis.

22. The oxygen ion composite membrane of claim 21 further comprising a third layer disposed on the second layer to form a porous surface exchange layer, the third layer also comprises a mixture of $(Ln_{1-x}A_x)_wCr_{1-y}B_yO_{3-\delta}$ and the doped zirconia, where Ln is La, Y, Pr, Ce or Sm; A is Ca or Sr; B is Fe, Mn, Co, Al, Ti or combinations thereof; w is between about 0.9 and 1.1; x is between about 0.1 and 0.4 and y is between about 0.1 and 0.6; wherein the third layer comprises $(Ln_{1-x}A_x)_wCr_{1-y}B_yO_{3-\delta}$ and doped zirconia in a third volume ratio of between about 1 to 3 and 3 to 1 on a volume percentile basis.

23. The oxygen ion composite membrane of claim 22 wherein the first mixture also contains particles of $Ce_{1-x}A_xO_2$ where A is Gd or Sm and x is between about 0.1 and 0.4.

24. The oxygen ion composite membrane of claim 23 wherein the doped zirconia is 10 mol % Scandia and 1 mol % Yttria Stabilized Zirconia (10Sc1YSZ).

25. The oxygen ion composite membrane of claim 24 wherein within the second layer x is 0.1 to 0.3.

26. The oxygen ion composite membrane of claim 22 wherein the porous support is of a tubular configuration and wherein the first volume ratio is about 3 to 2, the second volume ratio is about 2 to 3 and the third volume ratio is about 1 to 1.

27. An oxygen ion composite membrane produced by the process comprising the steps of:
 forming a first layer on a porous support, the first layer providing a porous fuel oxidation layer and comprising a first mixture of particles of $(Ln_{1-x}A_x)_wCr_{1-y}B_yO_{3-\delta}$ and doped zirconia where Ln is La, Y, Pr, Ce or Sm; A is Ca or Sr; B is Fe, Mn, Co, Al, Ti or combinations thereof; w is between about 0.9 and 1.1; x is between about 0.1 and 0.4 and y is between about 0.1 and 0.6; wherein the first layer further comprises $(Ln_{1-x}A_x)_wCr_{1-y}B_yO_{3-\delta}$ and doped zirconia in a first volume ratio of between about 2 to 3 and 4 to 2 on a volume percentile basis;
 forming a second layer on the first layer, the second layer providing a dense separation layer and comprising a second mixture of particles of $(Ln_{1-x}A_x)_wCr_{1-y}B_yO_{3-\delta}$ and the doped zirconia, where Ln is La, Y, Pr, Ce or Sm; A is Sr; and B is Fe, Mn, Co, Al, Ti or combinations thereof; w is between about 0.9 and 1.1; x is between about 0.1 and 0.4 and y is between about 0.1 and 0.6; wherein the second layer further comprises $(Ln_{1-x}A_x)_wCr_{1-y}B_yO_{3-\delta}$ and doped zirconia in a second volume ratio of between about 1 to 4 and 3 to 2 on a volume percentile basis; and
 sintering the porous support, the first layer and the second layer in air at prescribed sintering temperatures to produce the oxygen ion composite membrane.

28. The oxygen ion composite membrane produced by the process of claim 27 further comprising a step of:
 forming a third layer on the second layer, the third layer providing a porous surface exchange layer and comprising a third mixture of particles of $(Ln_{1-x}A_x)_wCr_{1-y}B_yO_{3-\delta}$ and doped zirconia, where Ln is La, Y, Pr, Ce or Sm; A is Ca or Sr; B is Fe, Mn, Co, Al, Ti or combinations thereof; w is between about 0.9 and 1.1; x is between about 0.1 and 0.4 and y is between about 0.1 and 0.6; wherein the third layer comprises $(Ln_{1-x}A_x)_wCr_{1-y}B_yO_{3-\delta}$ and doped zirconia in a third volume ratio of between about 1 to 3 and 3 to 1 on a volume percentile basis.

29. The oxygen ion composite membrane produced by the process of claim 27 further comprising a step of heating or firing the porous support at temperatures of about 1000° C. or more prior to applying the first layer.

30. The oxygen ion composite membrane produced by the process of claim 27 further comprising a step of heating or firing the porous support and first layer at temperatures of about 950° C. or more prior to applying the second layer.

31. The oxygen ion composite membrane produced by the process of claim 27 wherein the step of sintering the porous support further comprises fully sintering the porous support prior to applying the first layer.

32. The oxygen ion composite membrane produced by the process of claim 27 wherein the steps of sintering further comprise sintering the porous support and the first layer prior to applying the second layer.

\* \* \* \* \*